Dec. 2, 1952  F. E. KING  2,619,721
PRUNING SAW
Filed April 22, 1950
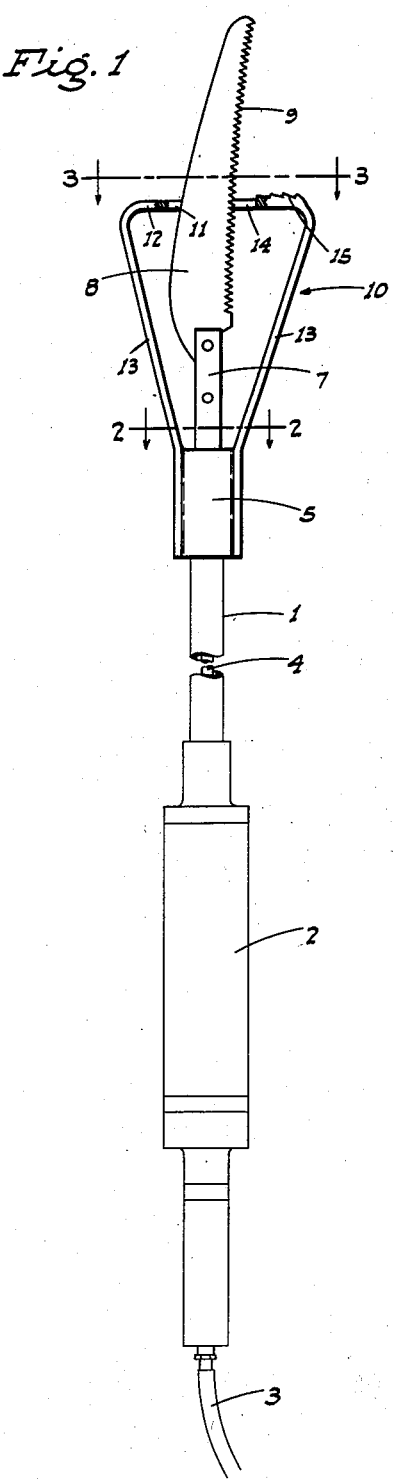
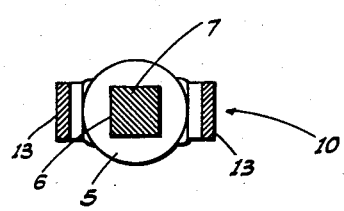
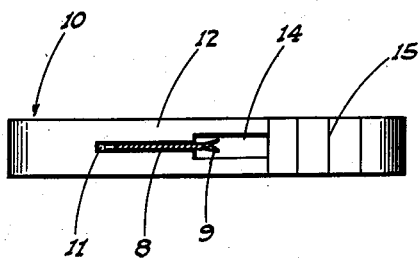
Inventor
Frank E. King
By
ATTORNEYS Patented Dec. 2, 1952

2,619,721

UNITED STATES PATENT OFFICE 2,619,721

PRUNING SAW

Frank E. King, Woodland, Calif.

Application April 22, 1950, Serial No. 157,433

2 Claims. (Cl. 30—166)

This invention relates in general to a tree pruning saw.

In particular the invention is directed to, and it is a major object to provide, a novel power actuated tree pruning saw of extension handle type.

Another important object of the invention is to provide a pruning saw, as above, which embodies a novel saw blade guide and limb holder unit; such unit guiding the saw against undue lateral deflection and holding the limb stable for easy sawing of the same.

A further object of the invention is to provide a pruning saw, as in the preceding paragraph, wherein said saw blade guide and limb holder includes, on the outer end of the device and adjacent the longitudinal reciprocable saw, a limb engaging cross member having a guide slot therein through which the saw projects, and limb holding serrations on the outer face of the cross member and toward which serrations the saw teeth face.

An additional object of the invention is to provide a pruning saw having a blade guide and limb holder unit, which greatly aids the operator in use of the saw; pruning operations being accelerated, a better and cleaner cut being obtained, and blade breakage being reduced to a minimum.

It is also an object of the invention to provide a pruning saw which is designed for ease and economy of manufacture.

Still another object of the invention is to provide a practical and reliable pruning saw, and one which will be exceedingly effective for the purpose for which it is designed.

These objects are accomplished by means of such structure and relative arrangement of parts as will fully appear by a persual of the following specification and claims.

In the drawings:

Fig. 1 is a side elevation, foreshortened, of an extension type, power actuated pruning saw embodying the present invention.

Fig. 2 is a cross section on line 2—2 of Fig. 1.

Fig. 3 is a cross section on line 3—3 of Fig. 1.

Referring now more particularly to the characters of reference on the drawings, the invention is embodied in a power actuated tree pruning saw of elongated or extension handle type; the device including generally a relatively long tubular extension handle 1, fixed at its rear end to a fluid motor 2 fed by a fluid pressure supply hose 3. The motor 2 is preferably of air actuated type, and is operative to reciprocate a rod 4 which extends through the tubular extension handle 1.

At its outer end the tubular extension handle 1 has a bearing sleeve 5 fixed thereon; such bearing sleeve having a rectangular bore 6 therein.

A square shank 7 extends through the rectangular bore 6, and said shank is connected at its outer end to the rod 4 for reciprocation by the latter.

At its forward or outer end the shank 7 is fixed to the rear end of an elongated, longitudinally extending saw blade 8 having a row of teeth 9 along one edge thereof.

Unless some means is provided to guide the saw blade 8 and to hold an adjacent limb stable, it is difficult to maintain the saw in proper cutting engagement with the limb. This is because of the range or distance of the saw blade from the operator who grasps the device adjacent the fluid motor 2.

The present invention provides, on a power actuated tree-pruning saw of extension handle type, a novel saw blade guide and limb holder unit, indicated generally at 10, and which is constructed as follows:

Intermediate the ends of its stroke the saw blade 8 projects in guided relation through a guide slot 11 formed lengthwise in a cross bar 12 disposed some distance outwardly of the bearing sleeve 5; such cross bar 12 being of substantial transverse length and being rigidly secured to said bearing sleeve 5 by integral legs 13 fixed to the bearing sleeve, and thence diverging outwardly to merge in integral relation with opposite ends of said cross bar 12.

At one end thereof the guide slot 11 is enlarged in width, as at 14, to permit the saw teeth 9 to run back and forth without said teeth striking against said cross bar 12.

The outer surface of the cross bar 12 is formed, on the side toward which the teeth 9 face, with a row of transverse teeth or serrations 15 which are cut to face the saw blade.

When the pruning saw is in use the portion of the cross bar 12 which is serrated as at 15 is abutted against the limb to be cut, and then the device is manipulated to urge the saw blade 8 across said limb in cut-off relation thereto; the serrations 15 biting into the limb and assuring that it cannot back or slip away from the saw blade during the cutting operation.

With the described saw blade guide and limb holder mounted on the outer end of a power actuated pruning saw of extension handle type, the cutting of limbs is materially expedited, and further quicker and cleaner cuts are obtainable.

The device, while being simple in its structure and economical to manufacture, is nevertheless strong and rugged; yet being light weight and not causing the pruning saw to be outer-end heavy.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent are desired:

1. A saw blade guide and limb holder unit, for a power actuated pruning saw having a longitudinally reciprocable saw blade projecting forward from the handle; said unit comprising a cross bar ahead of the handle, means rigidly securing the cross bar to the handle, said cross bar having a guide slot through which the saw blade runs in guided relation, and limb engaging serrations on the outer face of the cross bar in position such that the teeth of the saw blade face said serrations.

2. A saw blade guide and limb holder unit, for a power actuated pruning saw having a longitudinally reciprocable saw blade projecting forward from the handle; said unit comprising a cross bar ahead of the handle, means rigidly securing the cross bar to the handle, said cross bar having a guide slot through which the saw blade runs in guided relation, and limb engaging serrations on the outer face of the cross bar in position such that the teeth of the saw blade face said serrations; said securing means being legs connected between opposite ends of the cross bar and an outer end portion of the handle.

FRANK E. KING.

REFERENCES CITED

The following references are of record in the file of this patent:

UNITED STATES PATENTS

| Number | Name | Date |
| --- | --- | --- |
| 259,840 | Fowler | June 20, 1882 |
| 1,082,363 | Slusser | Dec. 23, 1913 |
| 1,224,194 | Miller | May 1, 1917 |
| 2,018,908 | Allen | Oct. 29, 1935 |
| 2,199,618 | Conover | May 7, 1940 |